T. BARBER.

PISTON PACKING.

No. 10,628. Reissued July 28, 1885.

WITNESSES:

William Miller

A. Faber du Faur Jr.

INVENTOR

Thomas Barber

BY

Van Santvoord & Hauff

ATTORNEYS

UNITED STATES PATENT OFFICE.

THOMAS BARBER, OF FLATBUSH, NEW YORK.

PISTON-PACKING.

SPECIFICATION forming part of Reissued Letters Patent No. 10,628, dated July 28, 1885.

Original No. 313,704, dated March 10, 1885. Application for reissue filed June 27, 1885.

*To all whom it may concern:*

Be it known that I, THOMAS BARBER, a citizen of the United States, residing at Flatbush, in the county of Kings and State of New York, have invented new and useful Improvements in Piston-Packings, of which the following is a specification.

This invention relates to improvements in piston-packings; and it consists in the combination, with a piston-head and follower, of an expanding ring composed of a number of wedge-shaped sections, a spring inclosed therein and acting upon the same, an expanding cone which fits into the expanding ring, a spring situated between the expanding cone and the follower and acting on the expanding cone, and a packing surrounding the expanding ring.

Figure 1:
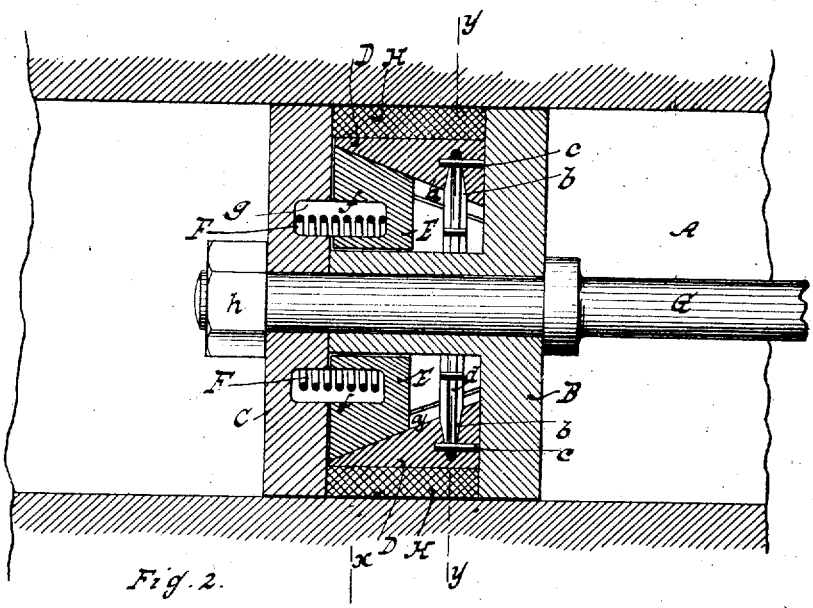
Figure 2:
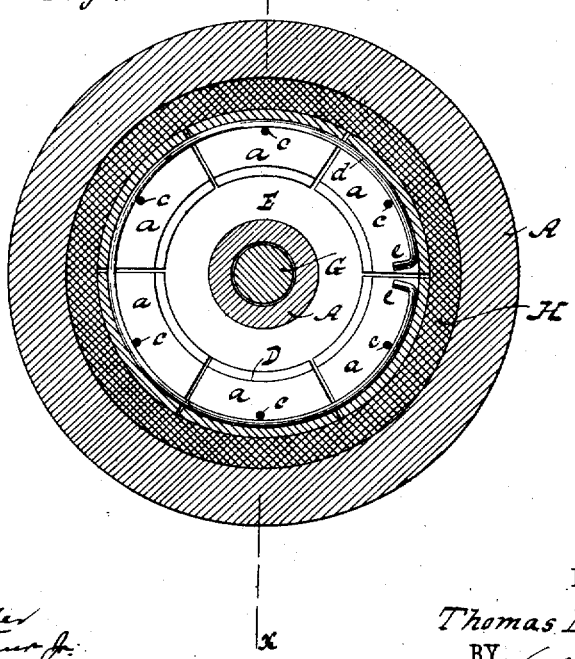

In the accompanying drawings, Figure 1 is a vertical section in the plane *x x*, Fig. 2. Fig. 2 is a vertical section in the plane *y y*, Fig. 1.

Similar letters indicate corresponding parts.

In the drawings, the letter A designates a part of a steam-cylinder which incloses a piston-head, B, with a follower, C. The annular space between the piston-head and the follower is occupied by an expanding ring, D, composed of a number of wedge-shaped sections, *a*. The inner side of each of these sections *a* is concave, and is provided with a transverse groove, *b*, through which passes a pin, *c*. When the sections are brought together to form the expanding ring, the concave inner sides form a part of a cone and the grooves *b* form a concentric annular groove.

The sections forming the expanding ring D are exposed to the action of a spring, *d*, fitted into the annular groove *b*, and held in place by the pins *c*, behind which it passes. The force of the spring tends to draw the sections together. To prevent the sections from sliding out from the spring, the ends of the spring are bent over to form hooks *e*, of such a size as not to interfere with the subsequent removal of any of the sections *a*.

Into the expanding ring projects an expanding cone, E, of the same taper as said expanding ring, which is provided with an annular recess, *f*, corresponding in position to another annular recess, *g*, formed in the follower C. The expanding cone is exposed to the action of a spiral spring, I, situated between the same and the follower, the spring fitting in the recesses *f g*, thus keeping the same in position.

When the sections forming the expanding ring D are together, as shown in the drawings, it does not come flush with the outer circumference of the piston-head B and follower C, but an annular space is left, which space is occupied by hemp or similar packing, H, or else the usual steel packing or piston rings may be used.

G is the piston-rod passing through the piston-head and follower and secured by means of a nut, *h*, or it may be secured in any other suitable manner.

It is evident the spring F, acting on the expanding cone E, continually tends to force the same down into the expanding ring D, the result of which is a tendency to spread the expanding ring and force the packing H against the walls of the cylinder. The spring *d*, acting inward, serves to keep the expanding ring D constantly pressed against the expanding cone.

By the combination of parts as above described, I have obtained a piston-packing which is self-adjusting as regards wear, insures a perfect and steam-tight fit of the piston, and prevents binding of the same, besides being of simple construction.

What I claim as new, and desire to secure by Letters Patent, is—

The combination, substantially as hereinbefore described, with the piston-head B and the follower C, of the expanding ring D, composed of a number of wedge shaped sections, *a*, the spring *d*, inclosed thereby and acting upon the same, the expanding cone E, which projects into the expanding ring, the spring F, situated between the expanding cone and the follower, and the packing H on the expanding ring.

In testimony whereof I have hereunto set my hand in the presence of two subscribing witnesses.

THOMAS BARBER.

Witnesses:
W. HAUFF,
E. F. KASTENHUBER.